United States Patent
Friedrich et al.

(10) Patent No.: US 9,583,222 B2
(45) Date of Patent: Feb. 28, 2017

(54) DEBRIS FILTER FOR NUCLEAR REACTOR INSTALLATION AND NUCLEAR FUEL ASSEMBLY COMPRISING SUCH A DEBRIS FILTER

(75) Inventors: Erhard Friedrich, Eckental (DE); Robert Koch, Hochstadt (DE); Dirk Blavius, Erlangen (DE); James Tolar, Richland, WA (US)

(73) Assignee: AREVA NP, Courbevoie (FR)

( * ) Notice: Subject to any disclaimer, the term of this patent is extended or adjusted under 35 U.S.C. 154(b) by 351 days.

(21) Appl. No.: 13/822,558

(22) PCT Filed: May 18, 2012

(86) PCT No.: PCT/EP2012/059298
§ 371 (c)(1),
(2), (4) Date: Jun. 26, 2013

(87) PCT Pub. No.: WO2012/160000
PCT Pub. Date: Nov. 29, 2012

(65) Prior Publication Data
US 2014/0056397 A1    Feb. 27, 2014

(30) Foreign Application Priority Data
May 20, 2011  (EP) ..................................... 11305627

(51) Int. Cl.
*G21C 19/42* (2006.01)
*G21C 3/32* (2006.01)
*G21C 3/322* (2006.01)

(52) U.S. Cl.
CPC ............. *G21C 3/3206* (2013.01); *G21C 3/32* (2013.01); *G21C 3/322* (2013.01); *Y02E 30/38* (2013.01)

(58) Field of Classification Search
CPC ... G21C 3/00; G21C 3/30; G21C 3/32; G21C 3/3206
See application file for complete search history.

(56) References Cited

U.S. PATENT DOCUMENTS 3,646,994 A    3/1972    Piepers et al.
3,847,736 A    11/1974   Bevilacqua
(Continued)

FOREIGN PATENT DOCUMENTS

CN    86105033 A    8/1985
CN    101622677 A   12/2006
(Continued)

OTHER PUBLICATIONS

International Search Report for corresponding International Application PCT/EP2012/059298.

*Primary Examiner* — Marshall O'Connor
(74) *Attorney, Agent, or Firm* — Davidson, Davidson & Kappel, LLC

(57) ABSTRACT

A debris filter for a nuclear reactor installation is provided. The debris filter comprises a plurality of plates arranged side-by-side in a spaced relationship and delimiting between them flow passages extending through the debris filter from a lower inlet face to an upper outlet face of the debris filter, each passage having an intermediate section offset with respect to an inlet section and an outlet section. At least one of the plates is formed with debris catching features distributed along the plate and protruding into at least one passage delimited by the plate.

23 Claims, 8 Drawing Sheets

(56) References Cited

U.S. PATENT DOCUMENTS

| | | | |
|---|---|---|---|
| 4,411,862 A | 10/1983 | Leclercq et al. | |
| 4,654,194 A | 3/1987 | Christiansen et al. | |
| 4,684,496 A * | 8/1987 | Wilson | G21C 3/32 |
| | | | 210/521 |
| 4,781,884 A | 11/1988 | Anthony | |
| 5,030,412 A | 7/1991 | Yates et al. | |
| 2008/0130820 A1 | 6/2008 | Ukai et al. | |

FOREIGN PATENT DOCUMENTS

| | | | |
|---|---|---|---|
| EP | 2 204 819 A1 | 7/2010 | |
| FR | EP 2204819 A1 * | 7/2010 | G21C 3/3206 |
| GB | 190628977 A | 12/1906 | |
| JP | U54-076497 | 6/1979 | |
| JP | A56-110090 | 9/1981 | |
| JP | A63-253294 | 10/1988 | |
| JP | A2001-116872 | 4/2001 | |
| JP | A2002-323585 | 11/2002 | |
| WO | WO 02058075 A1 | 7/2002 | |

* cited by examiner

DEBRIS FILTER FOR NUCLEAR REACTOR INSTALLATION AND NUCLEAR FUEL ASSEMBLY COMPRISING SUCH A DEBRIS FILTER

The present invention relates to a debris filter for a nuclear reactor installation, of the type comprising a plurality of plates arranged side-by-side in a spaced relationship and delimiting between them flow passages extending through the debris filter from a lower inlet face to an upper outlet face of the debris filter, each passage having an intermediate section offset with respect to an inlet section and an outlet section.

BACKGROUND

A nuclear fuel assembly for light water reactor conventionally comprises a bundle of elongated fuel rods extending parallel to each other. In use, the fuel assembly is oriented vertically in a nuclear reactor core and a coolant fluid is caused to flow upwardly between the fuel rods.

Debris might be present in the coolant fluid and damage the fuel rods thus requiring removing or replacing the fuel assembly or damaged fuel rods. In a known manner, a debris trap or filter is placed upstream the bundle of fuel rods to trap debris.

EP 0 455 010 discloses a debris filter having a plurality of plates having a wave shape delimiting between them flow passages. The curvature of the passages allows trapping debris whilst limiting flow resistance of the debris filter.

Nevertheless, thin and short debris oriented perpendicular to the flow direction may pass through the filter and flexible longer elongated debris may also pass through the filter.

SUMMARY OF THE INVENTION

An object of the invention is to provide a debris filter allowing improved debris trapping, namely thin debris for instance in the form of short or flexible wires.

To this end, a debris filter of the above-mentioned type is provided, wherein at least one plate is formed with debris catching features distributed along the plate and protruding into at least one passage delimited by the plate.

In other embodiments, the debris filter comprises one or several of the following features, taken in isolation or in any technically feasible combination:
  the debris catching features define debris catching spaces tapering upwardly;
  each pair of adjacent debris catching features of the plate define a debris catching space tapering upwardly;
  the plate is formed with debris catching features provided as vanes, each vane being cut in the plate and bent or twisted;
  the vanes are cut in a lower edge of the plate;
  the plate is formed with adjacent vanes twisted in the same direction;
  the plate is formed with vanes bent in one direction or twisted in one direction alternating with vanes bent in the opposite direction, respectively twisted in the opposite direction;
  the plate is formed with debris catching features provided as teeth cut in the plate, each tooth protruding obliquely inside a passage delimited by the plate and downwardly;
  the debris filter comprises teeth protruding one face of the plate alternating with teeth protruding the opposite face of the plate;
  the debris filter as described above, comprises connection strips intersecting the plates for maintaining the spacing between the plates;
  each plate comprises connection slots extending from the upper edge of the plate, each slot receiving a connection strip intersecting the plate;
  each connection strip is formed with spacing means for maintaining spacing between the upper portions of said plates;
  each connection strip is formed with spacing tabs cut in the upper edge of the connection strip, each spacing tab being twisted; and
  the lower edge of each connection strip is formed with interlocking slots, each for engaging the lower closed end of a slot of the plate in which the connection strip is received.

A nuclear fuel assembly comprising a bundle of fuel rods and a debris filter as defined above is also provided.

BRIEF SUMMARY OF THE DRAWINGS

The invention and its advantages will be better understood on reading the following description given solely by way of example and with reference to the appended drawings, in which.

DETAILED DESCRIPTION

Figure 1:
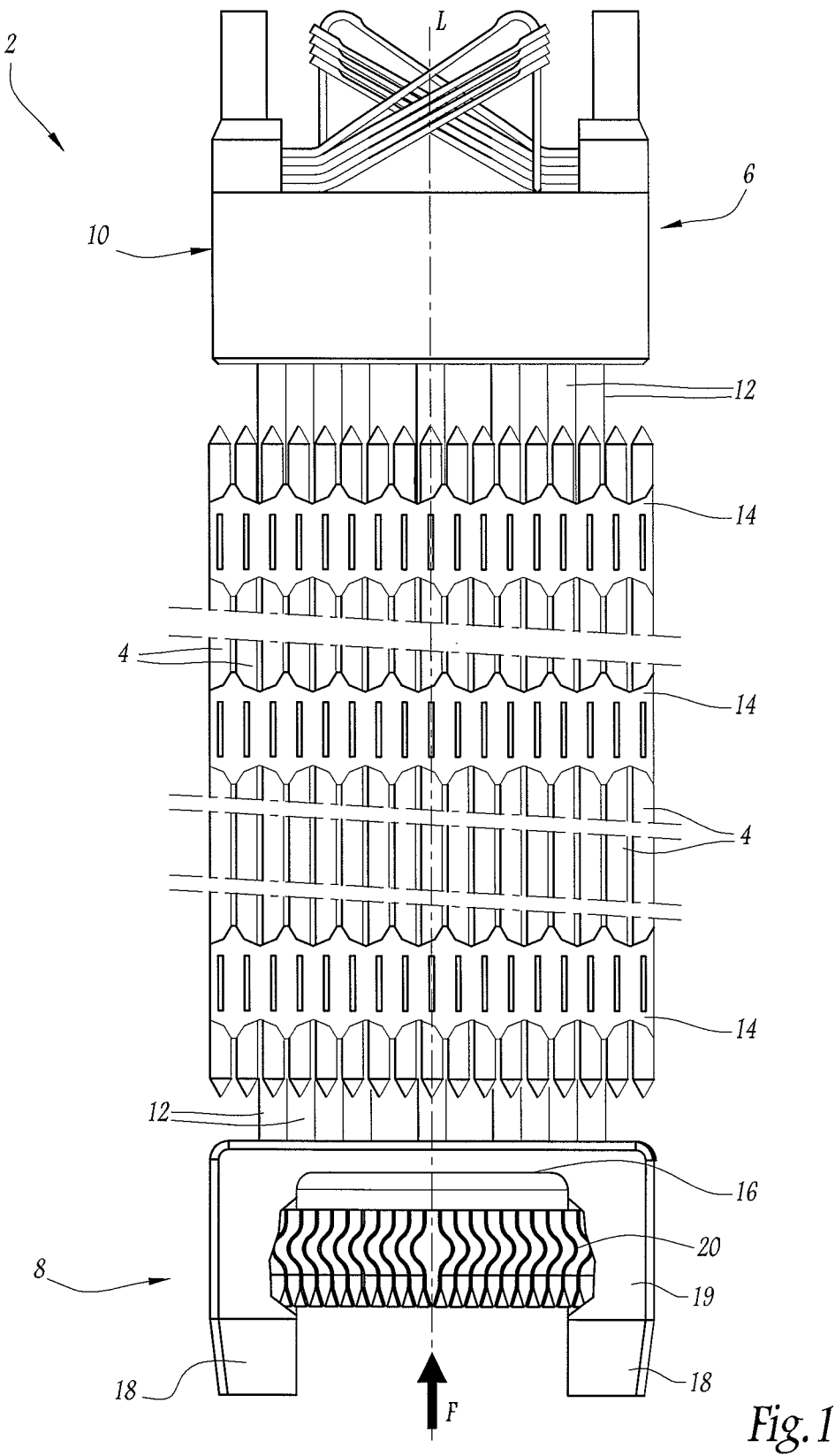
FIG. 1 is a partially cutaway side elevation view of a pressurized water reactor nuclear fuel assembly comprising a debris filter according to the invention.
Figure 2:
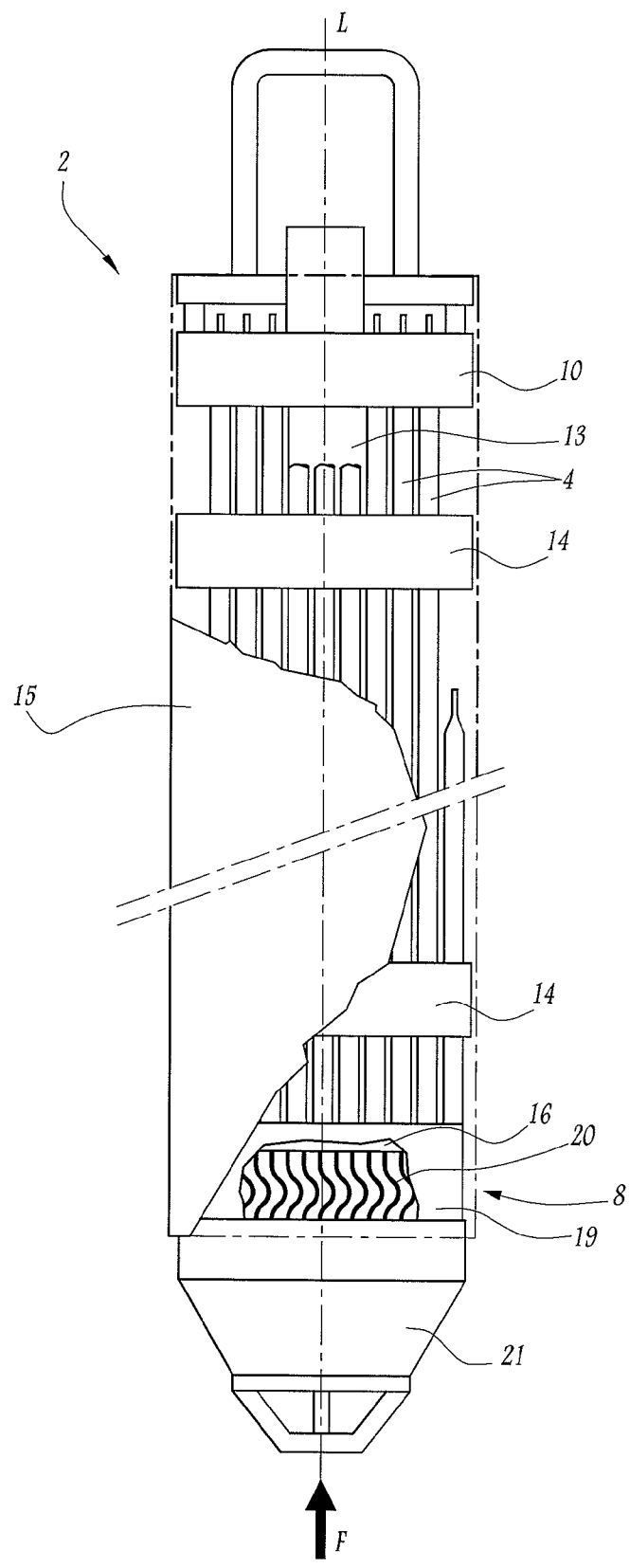
FIG. 2 is a partially cutaway side elevation view of a boiling water reactor nuclear fuel assembly comprising a debris filter according to the invention.

A nuclear fuel assembly as those illustrated in FIGS. 1 and 2 extends along a longitudinal axis L. Axis L extends vertically when the fuel assembly is disposed inside a nuclear reactor. In the following, the terms "upper" and "lower" refer to the position of the fuel assembly in a nuclear reactor.

The nuclear fuel assembly 2 illustrated in FIG. 1 is adapted for a Pressurized Water Reactor (PWR). It comprises a bundle of nuclear fuel rods 4 and a structure 6 for supporting the fuel rods 4.

Each fuel rod 4 comprises a tubular cladding, pellets of nuclear fuel stacked in the cladding, and caps closing the upper and lower ends of the cladding.

The structure 6 comprises a lower nozzle 8, an upper nozzle 10, a plurality of guide-tubes 12 and supporting grids 14 distributed along the guide-tubes 12.

The lower nozzle 8 and the upper nozzle 10 are spaced one from the other along the longitudinal axis L.

The guide-tubes 12 extend longitudinally between the lower nozzle 8 and the upper nozzle 10 and connect the nozzles 8, 10. The guide-tubes 12 maintain a predetermined longitudinal spacing between the nozzles 8, 10. Each guide-tube 12 opens upwardly for allowing insertion of a control rod downwardly inside the guide-tube 12.

The grids 14 are distributed along the guide-tubes 12 and connected to them. The fuel rods 4 extend longitudinally between the nozzles 8, 10 through the grids 14. The grids 14 support the fuel rods 4 transversely and longitudinally.

The lower nozzle 8 comprises a lower tie plate 16, a skirt 19 extending downwardly from the lower tie plate 16, a debris filter 20 placed below the lower tie plate 16 and inside the skirt 19 for filtering coolant entering the fuel assembly 2, and feet 18 extending the skirt 19 downwardly for positioning the fuel assembly on the lower plate of the nuclear reactor core.

The nozzles 8, 10 are arranged for allowing a vertical coolant flow through the fuel assembly 2 from lower end toward upper end thereof as indicated by arrow F in FIG. 1.

The nuclear fuel assembly 2 illustrated in FIG. 2, where same numeral reference as in FIG. 1 designate similar elements, is for a boiling water reactor (BWR). It comprises a bundle of nuclear fuel rods 4 and a tubular water channel 13 encased in a tubular fuel channel 15. The fuel rods 4, the water channel 13 and the fuel channel 15 extend longitudinally parallel to axis L.

Each fuel rod 4 comprises a tubular cladding, pellets of nuclear fuel stacked in the cladding, and caps closing the upper and lower ends of the cladding.

The fuel rods 4 are arranged in a lattice and the water channel 13 replaces at least one of the fuel rods 4 in the lattice. The fuel channel 15 is partially cutaway to show the inside of the fuel assembly 2 and some fuel rods are cut away to show the water channel 13.

The BWR fuel assembly 2 comprises a lower nozzle 8, an upper nozzle 10 and supporting grids 14 distributed along the water channel 13 and connected to it. Only two spacer grids 14 are visible on FIG. 2. The function of the spacer grids 14 is to maintain the fuel rods axially and transversely with a transverse spacing between the fuel rods 4.

The fuel rods 4, the water channel 13 and the fuel channel 15 extend from the lower nozzle to the upper nozzle, with the water channel 13 and the fuel channel 15 connecting the lower nozzle 8 and the upper nozzle 10.

The lower nozzle 8 comprises a lower tie plate 16, a skirt 19 extending downwardly from the lower tie plate 16, a debris filter 20 placed below the lower tie plate 16 and inside the skirt 19 for filtering coolant entering the fuel assembly 2, and a tubular transition piece 21 extending the skirt 19 downwardly for connection to a coolant feeding duct.

The nozzles 8, 10 are arranged for allowing a vertical coolant flow through the fuel assembly 2 from lower end toward upper end thereof as indicated by arrow F in FIG. 2.

A debris filter 20 suitable for a PWR fuel assembly and a BWR fuel assembly will be described in greater details with reference to FIGS. 3-8.

Figure 3:
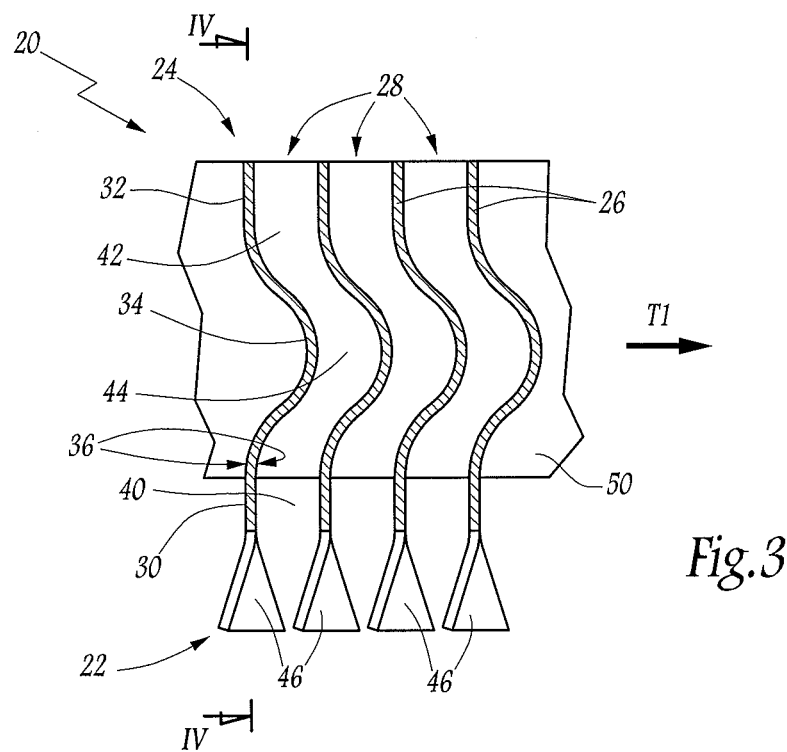
FIGS. 3 and 4 are enlarged partial sectional views of the debris filter of FIGS. 1 and 2, respectively taken along III-III on FIG. 4 and along IV-IV on FIG. 3.

As illustrated on FIG. 3, the debris filter 20 is in the shape of a screen and has a lower inlet face 22 and an upper outlet face 24. The debris filter 20 comprises a plurality of plates 26 arranged side-by-side in a spaced relationship defining between them flow passages 28 extending through the debris filter 20 from inlet face 22 to outlet face 24.

The plates 26 are distributed in a first transverse direction T1 perpendicular to the fuel assembly axis L. The plates 26 are elongated and extend parallel to each other in a second transverse direction T2 (FIG. 4) perpendicular to the first transverse direction T1 and to the fuel assembly axis L. Each pair of adjacent plates 26 defines a passage 28.

Each plate 26 extends between the inlet face 22 and the outlet face 24. Each plate 26 has a lower portion 30 extending from the inlet face 22, an upper portion 32 extending from the outlet face 24 and an intermediate portion 34 extending between the lower portion 30 and the upper portion 32. Each plate 26 has opposed plate faces 36.

Each passage 28 allows coolant to flow through the debris filter 20. Each passage 28 is provided such that there is not straight flow path through the passage 28 in the flow direction F through the debris filter 20. The outlet of each passage 28 can not be seen in straight line from the inlet of said passage 28. Each passage 28 comprises an inlet section 40 extending from the inlet face 22, an outlet section 42 extending from the outlet face 24 and an intermediate section 44 offset laterally with respect to the inlet section 40 and the outlet section 42.

Each plate 26 is curved. The intermediate portion 34 is waved from lower portion 30 to upper portion 32. Lower portion 30 and upper portion 32 are substantially coplanar and the intermediate portion 34 protrudes laterally. The intermediate portion 34 delimits an intermediate section 44 with the intermediate portion 34 of each adjacent plate 26.

As illustrated on FIG. 1, the debris filter 20 comprises two sets of plates 26 disposed in reversed direction to provide symmetry with respect to a median plan of the debris filter 20.

As illustrated on FIG. 2, the debris filter 20 comprises one set of plates 26 disposed in same direction to avoid bigger intermediate section 44 in the median plan of the debris filter 20.

Back to FIG. 3, the lower portion 30 of each plate 26 is formed with debris catching features distributed along the plate 26 and protruding into at least one passage 28 delimited by the plate 26. The debris catching features protrude in the inlet section 40 of each passage 28.

Figure 4:
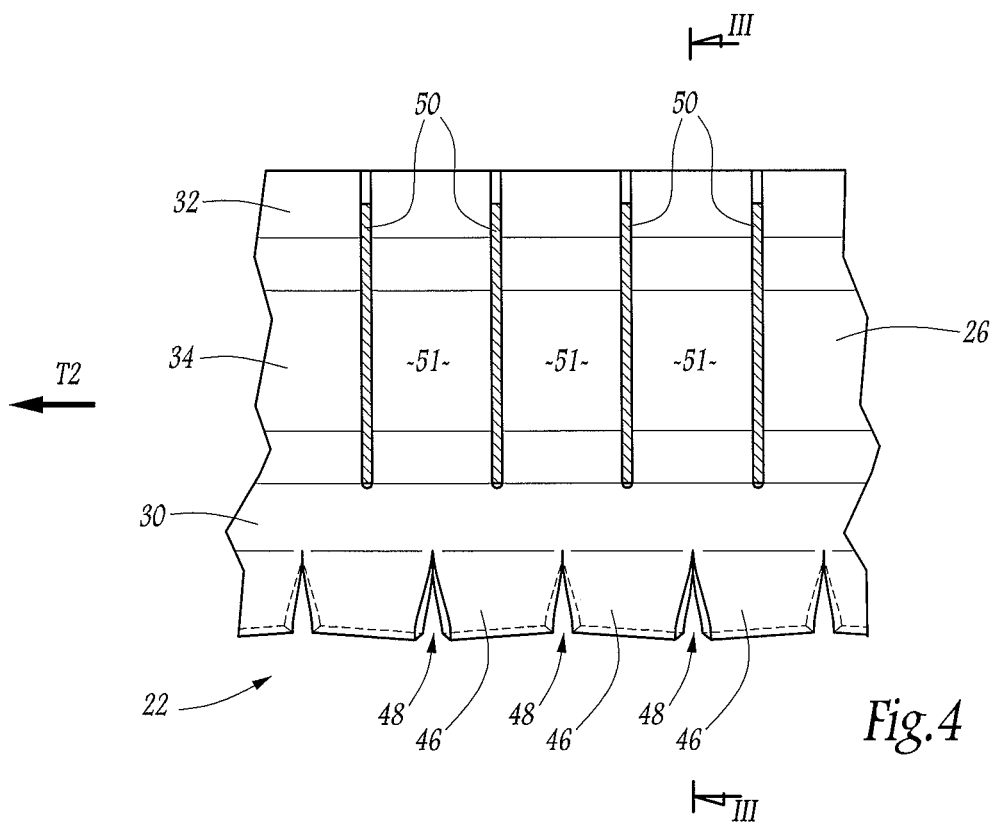

As illustrated on FIG. 4, the lower portion 30 of each plate 26 is formed with a plurality of debris catching vanes 46 distributed along the plate 26. The vanes 46 are formed by cutting notches 48 in a lower edge of the plate 26 and twisting the portion of the plate 26 defined between two adjacent notches 48. Each vane 46 is twisted by rotating the lower free end of the vane 46 with respect to the upper fixed end of the vane 46 connected to the rest of the plate 26 about a median longitudinal axis of the vane 46 extending between said lower free end and upper fixed end. Each plate 26 comprises vanes 46 twisted in one direction alternating with vanes 46 twisted in the other direction.

Figure 5:
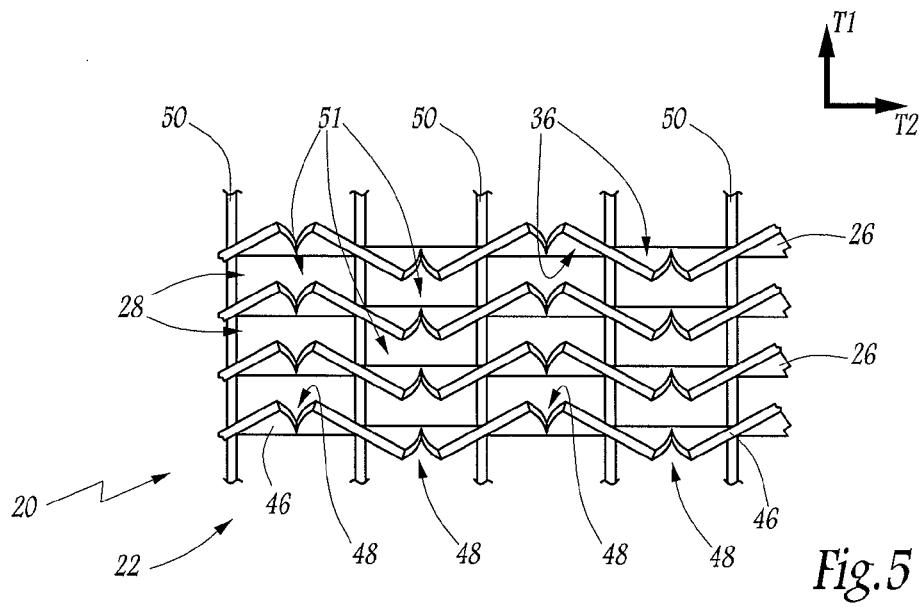
FIG. 5 is a bottom view of the debris filter of FIGS. 3 and 4.

As illustrated on FIG. 5, as a result of the twisting, each vane 46 protrudes from each plate face 36. Each vane 46 comprises one side portion protruding obliquely from a face 36 of the corresponding plate 26 into the passage 28 delimited by said face and downwardly, and a second side portion protruding obliquely from the other face 36 of the plate 26 into the passage 28 delimited by said other face and downwardly.

Each notch 48 separating a pair of adjacent vanes 46 exhibits a V-shape converging upwardly, that is in coolant flow direction F.

The adjacent side edges of each pair of adjacent vanes 46 protrude the same plate face 36 such that the inlet of the notch 48 delimited between said adjacent edges extends obliquely into a passage 28 and downwardly. Each notch 48 has a wide lower end offset inside a passage 28 delimited by said plate face 36.

Each notch 48 defines an upwardly tapering debris catching space.

As illustrated on FIGS. 3 and 4, the debris filter 20 comprises a plurality of connection strips 50 intersecting the plates 26 and maintaining the plates 26 in spaced relationship in the first transverse direction T1.

The strips 50 are elongated and extend parallel to each other perpendicularly to the plates 26 and to the assembly axis L. The strips 50 extend in the first transverse direction T12 and are distributed in spaced relationship in the second transverse direction T21.

The strips 50 divide each passage 28 into a plurality of channels 51 (FIG. 4) in the second transverse direction T2. Each strip 50 is located in register with a vane 46. Each channel 51 extends in register with a notch 48.

Figure 7:
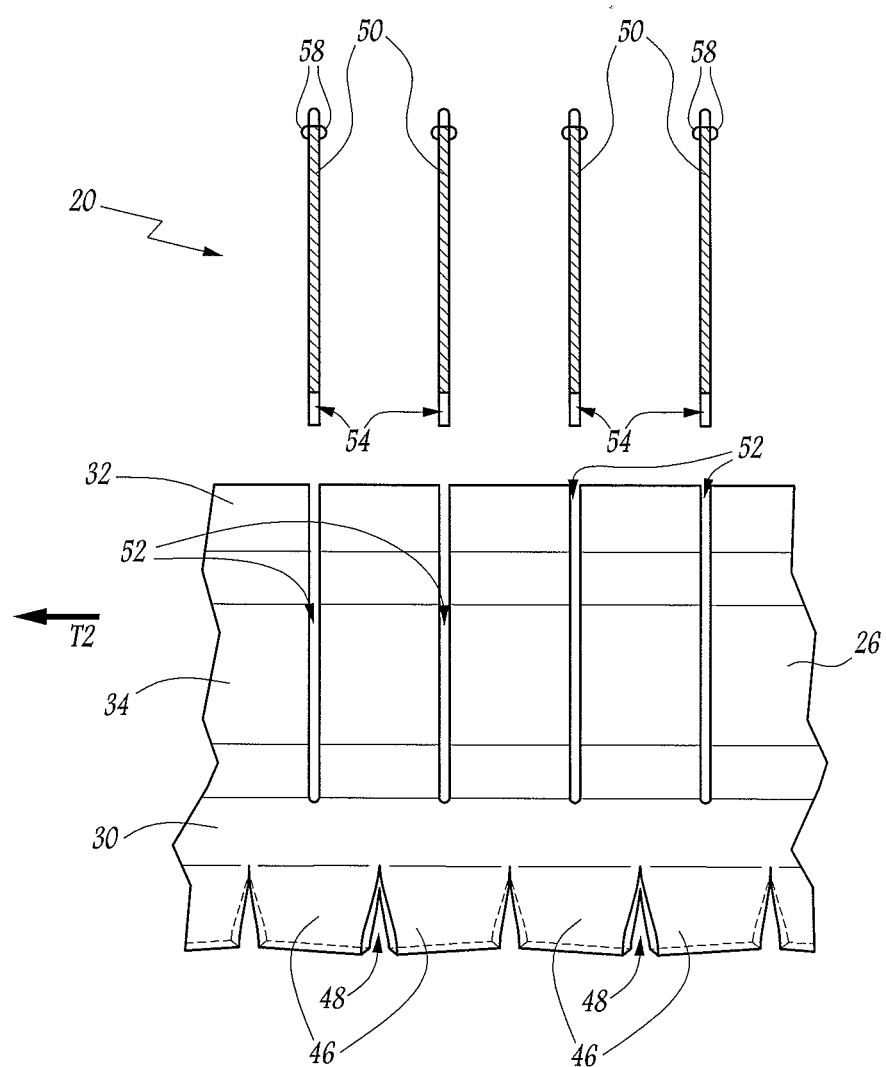

As illustrated on FIG. 7, each plate 26 comprises connection slots 52 distributed along the plate 26. Each slot 52 extends downwardly from the upper edge of the plate 26 through the upper portion 32 and the intermediate portion 34. Each slot 52 is for receiving a respective strip 50 intersecting the plate 26. Each slot 52 is located along the plate 26 in register with a vane 46.

Figure 6:
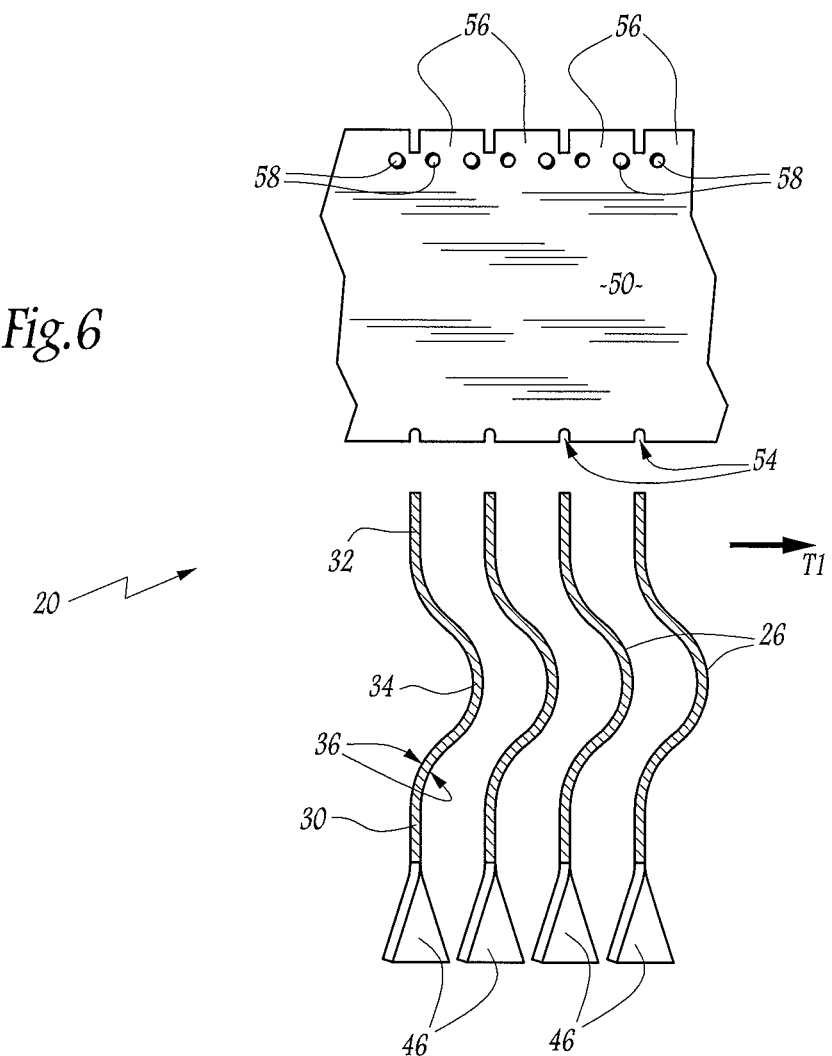
FIGS. 6 and 7 are enlarged partial sectional views of the debris filter corresponding to that of FIGS. 3-5, before assembly of the debris filter.

As illustrated on FIG. 6, each strip 50 is provided with interlocking slits 54 cut in a lower edge of the strip 50. Each interlocking slit 54 is arranged for interlocking with the lower closed end of a slot 52 of a plate 26 intersected by the strip 50 for locking the lower edge of the strip 50 with the plate 26 and maintaining the spacing between the lower portions 30 of the plates 26.

Each strip 50 is formed with a plurality of spacing tabs 56 cut in the upper edge of the strip 50 and distributed along said upper edge. Each spacing tab 56 is for maintaining the spacing between a pair of adjacent plates 26 intersected by the strip 50. Spacing tabs 56 are formed in each strip 50 by cutting slits in the strip upper edge and twisting the portion of the strip 50 defined between two adjacent slits.

Figure 8:
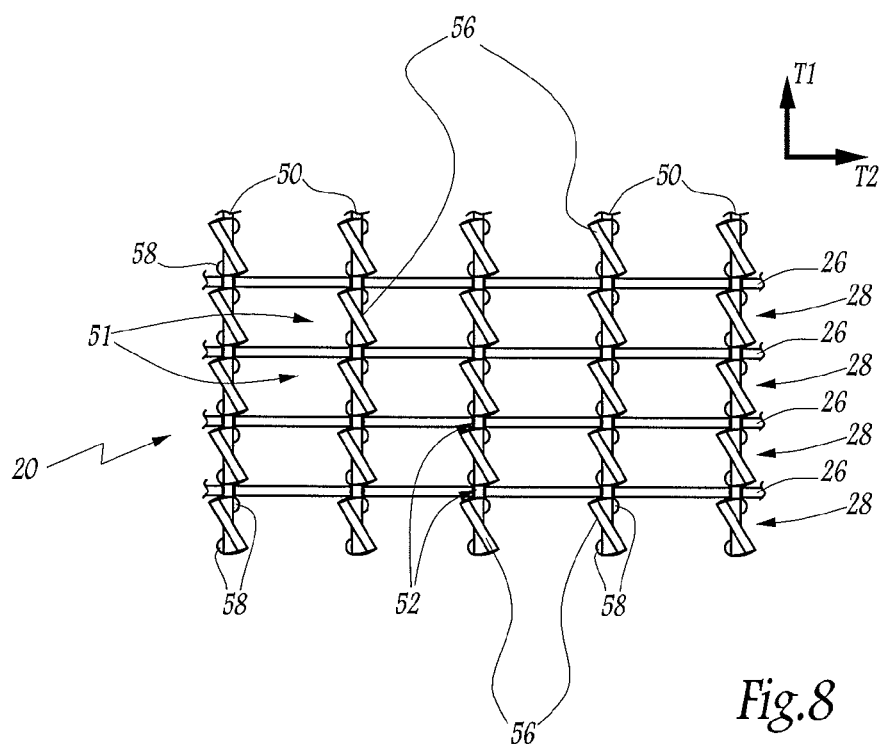
FIG. 8 is a partial top view of the debris filter of FIGS. 3 and 4.

As illustrated on FIG. 8, as a result of the twisting, each spacing tab 56 of a strip 50 extending between two adjacent plates 26 intersected by the strip 50 is offset with respect to the slots 52 of the two adjacent plates 26 receiving the strip 50. Each spacing tab 56 thus prevents facing faces 36 of the two adjacent plates 26 from getting closer by abutting on the sides of the slots 52.

Each spacing tab 56 allows maintaining the spacing between the upper portions 32 of two adjacent plates 26 in a simple and reliable manner. This allows fixing the connection strips 50 to the plates 26 for instance by brazing at the upper edges thereof in a geometrically controlled manner.

In alternative or in addition, each strip 50 is formed with a plurality of guiding dimples 58 stamped close to upper edge of the strip 50 and distributed along said upper edge. Each dimple 58 is for maintaining the spacing between a pair of adjacent plates 26 intersected by the strip 50. Each dimple 58 thus prevents facing faces 36 of the two adjacent plates 26 from getting closer by abutting on the dimples 58. Each dimple 58 allows maintaining the spacing between the upper portions 32 of two adjacent plates 26 in an even simpler and more reliable manner.

In the embodiment of FIGS. 6-8, each strip 50 comprises dimples 58 protruding one face alternating with dimples 58 protruding the other face along the strip 50. In an alternative embodiment, dimples 58 protrude for instance one of the two faces of the strip 50.

In operation, coolant flows through the debris filter 20 from the inlet face 22 to the outlet face 24. Coolant flows successively through the inlet section 40, intermediate section 44 and outlet section 42 of the passages 28. In the inlet section 40, thin debris present in the coolant flow are wedged in the notches 48 between the vanes 46. Each notch 48 is appropriate for catching debris by a wedging effect, specifically flexible wires. A flexible wire entering the wide lower end of a notch 48 will be wedged in the narrow upper end of the notch 48.

The elongated debris are further trapped in the intermediate section 44 due to the non-rectilinear shape of each passage 28. Twisted vanes 46 tend to align the elongated debris passing the vanes 46 with the flow direction F, thus improving trapping of these elongated debris in the intermediate section 44.

Besides, the strips 50 dividing each passage 28 into a plurality of channels 51 prevent debris oriented in the second transverse direction T2 to pass through the passages 28.

Figure 9:
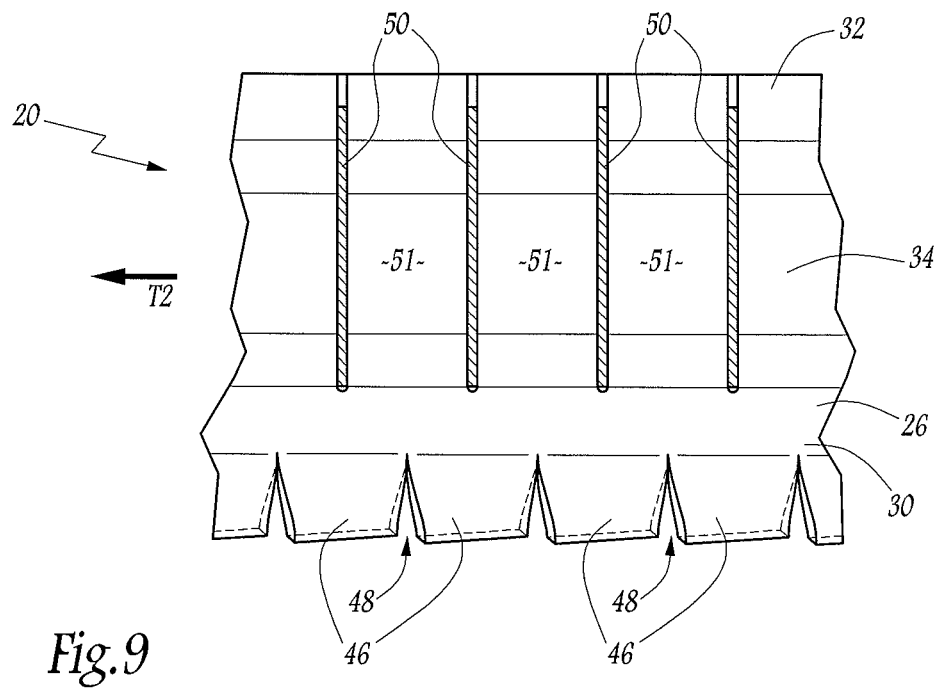
FIG. 9 is a view analogue to that of FIG. 4 of an alternative embodiment.

The alternative embodiment illustrated on FIG. 9 differs from that of the embodiment of FIGS. 3-8 in that each plate 26 comprises adjacent vanes 46 twisted in the same direction. The notches 48 have thus a wider lower end.

Figure 10:
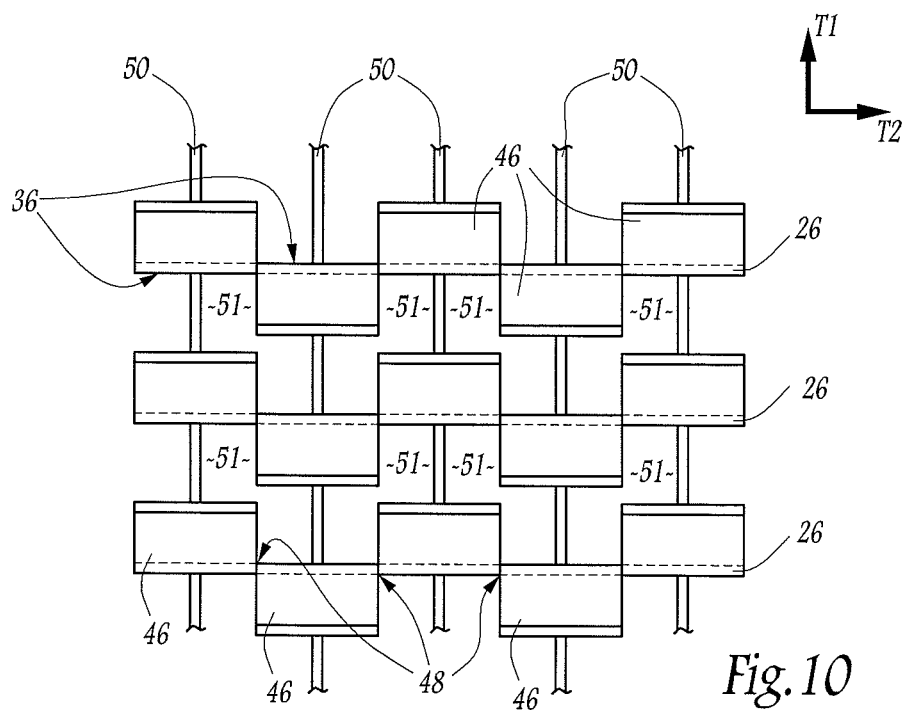
FIG. 10 is a view analogue to that of FIG. 5 of another alternative embodiment.

The alternative embodiment illustrated on FIG. 10 differs from that of the embodiments of FIGS. 3-8 in that each plate 26 comprises vanes 46 each bend along its upper end connected to the rest of the plate 26 in a direction such as to project obliquely from a plate face 36 and downwardly. Each plate 26 has adjacent vanes 46 bent in opposite directions: each plate 26 has vanes 46 projecting from a plate face 36 alternating with vanes 46 projecting from the opposite plate face 36. The notches 48 have thus a wider lower end.

Figure 11:
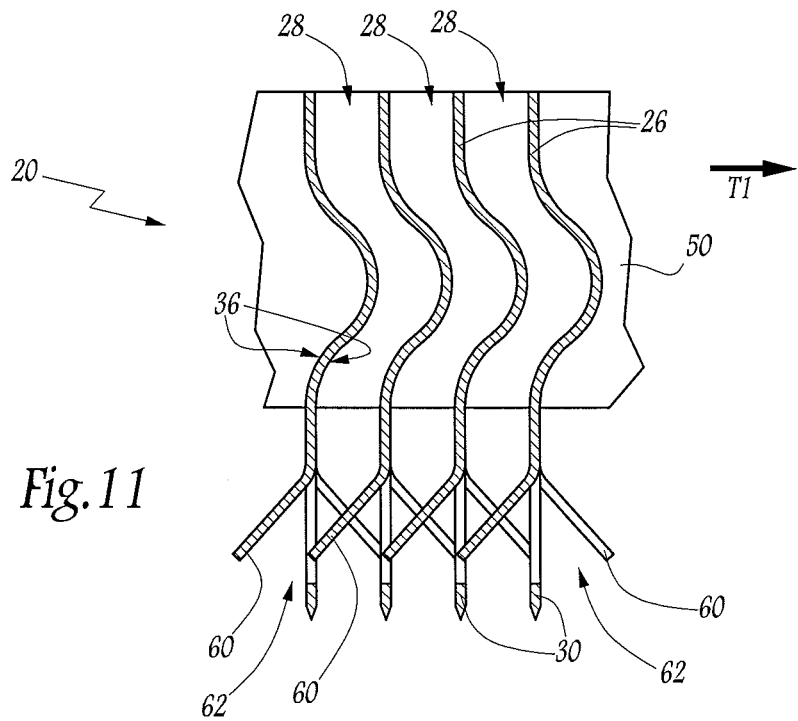
FIGS. 11 and 12 are figures analogue to that of FIGS. 3 and 4 of another alternative embodiment.
Figure 12:
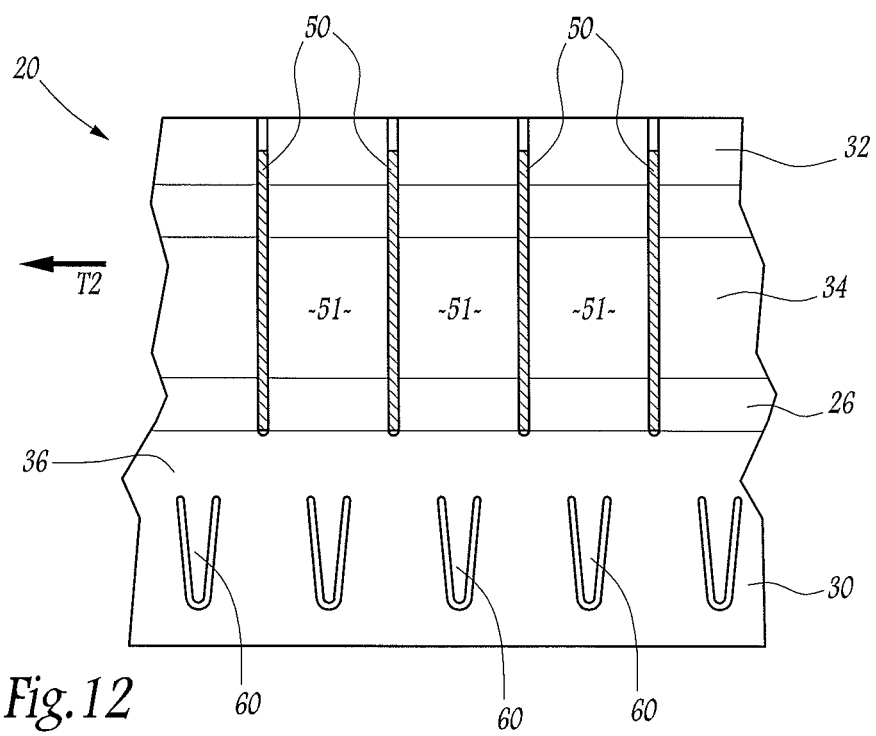

The alternative embodiment of FIGS. 11 and 12 differs from that of FIGS. 3-10 in that the vanes are replaced by debris catching teeth 60 distributed along each plate 26. The teeth 60 are cut in the lower portion 30 of each plate 26. Each tooth 60 protrudes from one plate face 36, obliquely away from the plate face 36 and downwardly. Each tooth 60 is located in register with a channel 51 delimited between two connection strips 50.

Each set of teeth 60 protruding one face 36 of a plate 26 defines a filtering comb in the passage 28 delimited by said face. Each tooth 60 delimits with the lower portion 30 an upwardly tapering space 62 (FIG. 11) for wedging debris between the tooth 60 and the lower portion 30 of the plate 26.

As illustrated on FIGS. 11 and 12, the plates 26 comprise teeth 60 protruding one plate face 36 alternating with teeth 60 protruding the opposite plate face 36. In an alternative embodiment, each plate 26 comprises adjacent teeth 60 protruding the same plate face 36.

The debris filter of the invention is adapted for Pressurized Water Reactor (PWR) fuel assemblies or Boiling Water Reactor (BWR) fuel assemblies. More generally, it may also be used in any Water Cooled Reactor fuel assembly, for instance for a VVER (Water-Water Energetic Reactor) fuel assembly.

What is claimed is:

1. A debris filter for a nuclear reactor installation, the debris filter being in the shape of a screen having a lower inlet face and an upper outlet face, the debris filter comprising:

a plurality of plates arranged side-by-side in a spaced relationship and delimiting between them flow passages extending through the debris filter from the lower inlet face to the upper outlet face, each passage having an intermediate section offset with respect to an inlet section and an outlet section, each plate having a lower portion extending from the inlet face, an upper portion extending from the outlet face and a waved intermediate portion extending between the lower portion and the upper portion and delimiting an intermediate section with the intermediate portion of each adjacent plate, at least one of the plates being formed with debris catching features distributed along the lower portion of the plate and protruding into at least one passage delimited by the plate, each debris catching feature being delimited in the plate by at least one notch or slot formed in the plate, each debris catching feature extending downwardly from the plate and delimiting at least one upwardly tapering debris catching space.

2. The filter according to claim 1, wherein the debris catching features are arranged as pairs of adjacent debris catching features and each pair of adjacent debris catching features of the plate define a debris catching space tapering upwardly.

3. The filter according to claim 1, wherein the plate is formed with debris catching features provided as vanes, each vane being cut in the plate and bent or twisted.

4. The filter according to claim 3, wherein the vanes are cut in a lower edge of the plate.

5. The filter according to claim 3, wherein the vanes are adjacent and twisted in the same direction.

6. The filter according to claim 3, wherein the vanes include vanes bent in one direction or twisted in one direction alternating with vanes bent in the opposite direction, respectively twisted in the opposite direction.

7. The filter according to claim 1, wherein the plate is formed with debris catching features provided as teeth cut in the plate, each tooth protruding obliquely inside a passage delimited by the plate and downwardly.

8. The filter according to claim 7 wherein the plates include teeth protruding from one face of the plate that alternate with teeth protruding the opposite face of the plate.

9. The filter according to claim 1 further comprising connection strips intersecting the plates for maintaining the spacing between the plates.

10. The filter according to claim 9, wherein each plate comprises connection slots extending from the upper edge of the plate, each slot receiving a corresponding one of the connection strips intersecting the plate.

11. The filter according to claim 9, wherein each connection strip is formed with spacing means for maintaining spacing between the upper portions of said plates.

12. The filter according to claim 9, wherein each connection strip is formed with spacing tabs cut in the upper edge of the connection strip, each spacing tab being twisted.

13. The filter according to claim 9, wherein the lower edge of each connection strip is formed with interlocking slits, each for engaging the lower closed end of a slot of the plate in which the connection strip is received.

14. A nuclear fuel assembly comprising:
a bundle of fuel rods; and
a debris filter according to claim 1.

15. The filter according to claim 9, wherein each connection strip includes guide dimples provided on the intersecting strips for maintaining the spacing between the plates.

16. The filter according to claim 1, wherein the plate comprises a plurality debris catching features provided as vanes cut in a lower edge of the plate and separated by the notches defining the debris catching spaces.

17. The filter according to claim 16, wherein each notch exhibits a V-shape converging upwardly.

18. The filter according to claim 16, wherein at least one of the vanes protrudes on both faces of the plate, the at least one vane having one edge protruding from one of the faces of the plate and another edge protruding from the other of the faces of the plate.

19. The filter according to claim 16, wherein at least one of the vanes protrudes on one face of the plate, both edges of the at least one vane protruding from the same face of the plate.

20. The filter according to claim 16, wherein adjacent side edges of vanes of a pair of adjacent vanes separated by a notch protrude from a same face of the plate.

21. The filter according to claim 7, wherein each tooth defines an upwardly tapering debris catching space with the lower portion of the plate.

22. A debris filter for a nuclear reactor installation, the debris filter being in the shape of a screen having a lower inlet face and an upper outlet face, the debris filter comprising:

a plurality of plates arranged side-by-side in a spaced relationship and delimiting between them flow passages extending through the debris filter from the lower inlet face to the upper outlet face, each passage having an intermediate section offset with respect to an inlet section and an outlet section, each plate having a lower portion extending from the inlet face, an upper portion extending from the outlet face and a waved intermediate portion extending between the lower portion and the upper portion and delimiting an intermediate section with the intermediate portion of each adjacent plate, at least one of the plates being formed with debris catching features distributed along the lower portion of the plate and protruding into at least one passage delimited by the plate, the debris catching features being provided as vanes cut in a lower edge of the plate and separated by notches, the vanes extending downwardly with being twisted such that edges of the vanes protrude on opposed faces of the plate, the vanes each having one of the edges protruding from one of the faces of the plate and another of the edges protruding from the other of the faces of the plate, or bent to protrude on one of the faces of the plate, both edges of the respective vane protruding from the same face of the plate, one of the edges of each vane delimiting with an adjacent one of the edges of an adjacent one of the vanes a debris catching space tapering upwardly.

23. A debris filter for a nuclear reactor installation, the debris filter being in the shape of a screen having a lower inlet face and an upper outlet face, the debris filter comprising:

a plurality of plates arranged side-by-side in a spaced relationship and delimiting between them flow passages extending through the debris filter from the lower inlet face to the upper outlet face, each passage having an intermediate section offset with respect to an inlet section and an outlet section, each plate having a lower portion extending from the inlet face, an upper portion extending from the outlet face and a waved intermediate portion extending between the lower portion and the upper portion and delimiting an intermediate section with the intermediate portion of each adjacent plate, at least one of the plates being formed with debris catching features distributed along the lower portion of the plate and protruding into at least one passage delimited by the plate, the plate being formed with the debris catching features provided as teeth cut in the plate, each tooth protruding obliquely inside a passage delimited by the plate and downwardly, each tooth defining an upwardly tapering debris catching space with the lower portion of the plate.

* * * * *